UNITED STATES PATENT OFFICE.

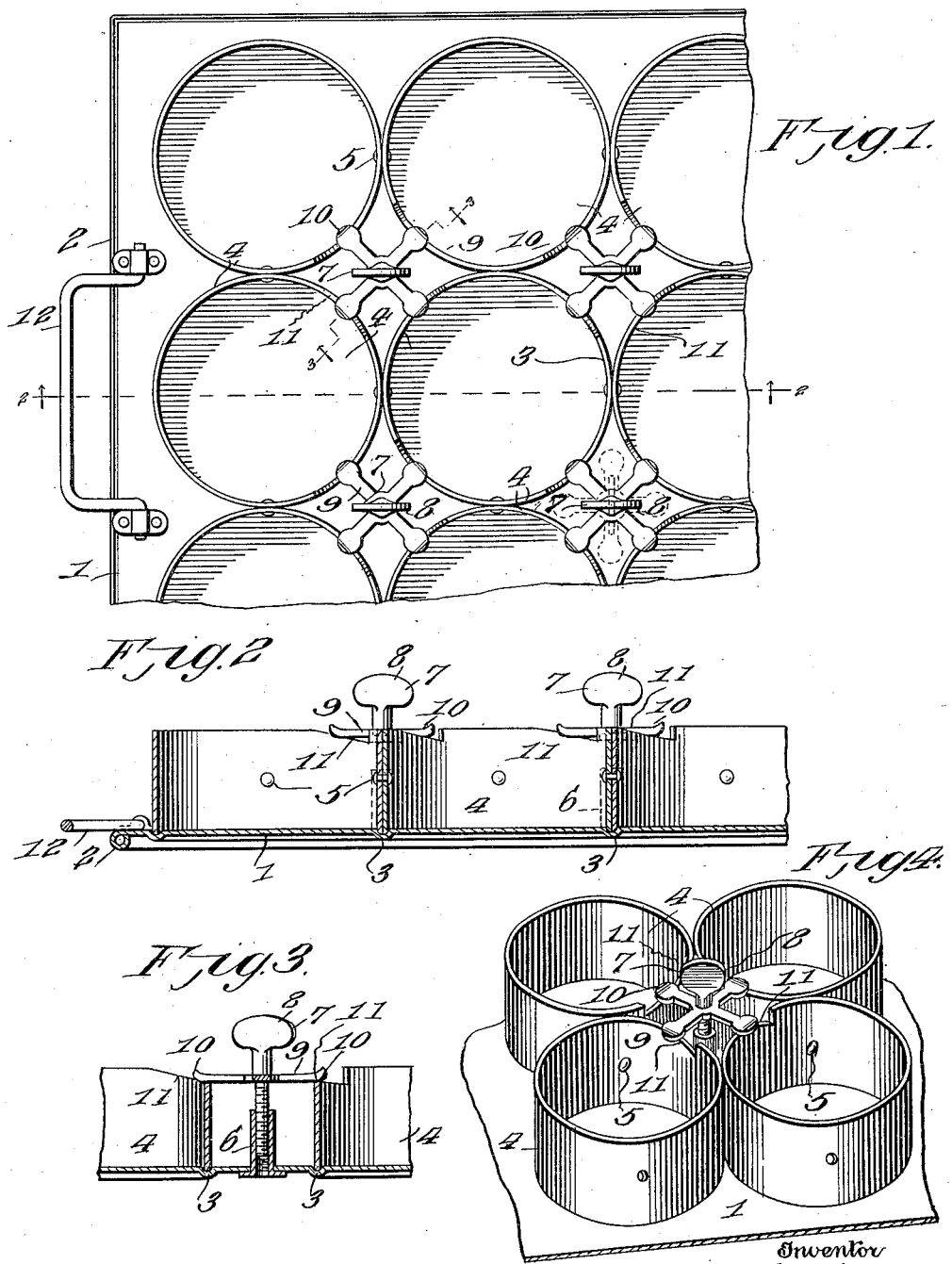

ROSE S. WOODWORTH, OF CORNISH, OKLAHOMA.

BAKING-PAN.

1,029,483.  Specification of Letters Patent.  Patented June 11, 1912.

Application filed June 16, 1911. Serial No. 633,454.

*To all whom it may concern:*

Be it known that I, ROSE S. WOODWORTH, a citizen of the United States, residing at Cornish, in the county of Jefferson and State of Oklahoma, have invented new and useful Improvements in Baking-Pans, of which the following is a specification.

This invention relates to bake pans or molds for baking cookies, muffins, gems, tea cakes and the like.

The invention has for its object to produce a bake pan in which the mold rings shall be detachably associated with the bottom of the pan in a simple and convenient manner.

A further object of the invention is to produce a bake pan of the character described in which the parts shall be so associated together that thin batter may be used without danger of leakage.

A still further object of the invention is to produce a device of the character described which will enable the mold rings to be clamped with relation to the body of the pan.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a top plan view of a bake pan constructed in accordance with the invention. Fig. 2 is a sectional view taken on the line 2—2 in Fig. 1. Fig. 3 is a sectional detail view taken on the line 3—3 in Fig. 1. Fig. 4 is a perspective detail view showing a group of the mold rings, together with a portion of the bottom pan and the fastening means.

Corresponding parts in the several figures are denoted by like characters of reference.

The bottom pan 1 of the improved device may be beaded along the edges, as shown at 2, to strengthen or reinforce it, and said pan is provided with a plurality of rows of circular grooves or depressions 3 to receive the lower edges of the mold rings 4. Of the latter any desired number may be used, said rings being grouped together in any suitable and convenient manner, and adjacent mold rings may be connected together by suitable connecting means, such as rivets 5. The bottom pan is provided at points intermediate each group of four mold rings and equidistantly from each with upstanding tubes 6 which are interiorly threaded for the reception of set screws 7 having heads 8, whereby they may be conveniently turned and tightened. Each set screw supports a cruciform clamping member 9, the arms of which are provided with terminal heads 10 adapted to engage the upper edges of the mold rings which are provided with beveled or cam-shaped recesses 11 adapted to be engaged by said clamping members which by turning the screws with which they are associated, may be tightened against the upper edges of the mold rings, which may be further tightened by rotation of the cruciform clamping members engaging the beveled notches at the upper edges of the mold rings. The terminal heads 10 of the arms of the clamping members 9 are preferably upturned, as shown, so that they will readily engage and slide over the cam-shaped recesses, and also serve to more securely hold the mold rings in engagement with the grooves of the bottom pan 1.

It will be readily seen that by the construction herein described, the mold rings may be tightly clamped upon the bottom pan, after which batter may be placed in said mold rings. After the cakes have been baked, a partial rotation of the set screws will loosen the mold rings sufficiently to enable them to be lifted from the bottom pan, so as to permit a knife blade to be introduced beneath the cakes to loosen them in the event that they should stick to the bottom pan. The bottom pan is provided with a handle 12 for convenience in manipulation. Thus, it is not only made possible to very conveniently detach the mold rings from the bottom pan and the cakes from the mold rings, but the parts, when separated, may be very conveniently and thoroughly washed and kept in a clean and sanitary condition.

Having thus described the invention, what is claimed as new, is:—

In a bake pan, a bottom pan having a plurality or rows of annular grooves and upstanding interiorly threaded tubes, one tube being disposed intermediate each group of four grooves, mold rings engaging the grooves and having inclined recesses at their upper edges, set screws engaging the threaded tubes, and clamping members upon said set screws having arms provided with terminal heads engaging the inclined recesses at the upper edges of the mold rings.

In testimony whereof I affix my signature in presence of two witnesses.

ROSE S. WOODWORTH.

Witnesses:
 A. G. JONES,
 W. W. WOODWORTH.

Copies of this patent may be obtained for five cents each, by addressing the "Commissioner of Patents, Washington, D. C."